Patented Nov. 14, 1933

1,935,515

UNITED STATES PATENT OFFICE 1,935,515

METHOD OF MAKING HALOGENATED AROMATIC AMINES

Lindley E. Mills, Midland, Mich., assignor to The Dow Chemical Company, Midland, Mich., a corporation of Michigan No Drawing. Application January 7, 1930
Serial No. 419,218

9 Claims. (Cl. 260—130.5)

The present invention is concerned with the preparation of ring-halogenated aromatic amino compounds, particularly with a method which involves reacting a poly-halogenated aromatic hydrocarbon with a volatile ammonia base, and more particularly, reacting ammonia or a primary alkyl amine selectively with one of two different halogens attached to an aromatic nucleus in the 1:4 positions, respectively.

It is known that halogen attached to an aromatic ring can be replaced by an amino group; e. g. Hale and Cheney (U. S. 1,729,775) react a poly-halogenated aromatic hydrocarbon, such as ortho-dichloro-benzene, with anhydrous ammonia in the presence of a copper-containing catalyst, in an alcoholic medium, at a temperature between about 150° and 250° C. However, such procedure involves employment of a relatively high reaction temperature. Furthermore, when one of the chlorine groups is replaced by an amino group, the second chlorine group has an increased tendency also to be replaced with the formation of a diamino compound, secondary products resulting from reaction between the amino and chloro compounds, and decomposition products from the aromatic diamine, thereby considerably lowering the yield of desired product. I have now discovered that poly-halo-compounds, when substituted by two different halogens in the 1:4 positions to each other, e. g., 4-chloro-bromobenzene, may be reacted similarly with ammonia or equivalent base at a lower temperature than used by Hale and Cheney, and in an aqueous medium, whereby one of the halogens may be replaced by an amino group easier than the other, i. e. bromine may be replaced easier than chlorine, to form halo-amino-compounds in good yields and in substantially pure form, the formation of byproducts or decomposition products being substantially avoided. Accordingly, when 4-chloro-bromo-benzene, or equivalent compounds, is treated under pressure with ammonia or a primary alkyl amine in the presence of a copper-containing catalyst, an amino-chloro-compound e. g. 4-chloro-aniline, may be formed, the bromine, due to its greater reactivity, being replaced by the basic group. Hence, the purpose of my present invention is to provide a method of reacting a poly-halogenated aromatic hydrocarbon with ammonia or a primary alkyl amine under such conditions that only the most labile of these halogens is replaced by the basic group, by which method there may be formed aromatic halo-amino-compounds which are useful products, utilizable in the dye, pharmaceutical, and related industries.

To the accomplishment of the foregoing and related ends, my invention, then, consists of the method hereinafter fully described and particularly pointed out in the claims, the following description setting forth in detail several modes of carrying out the invention, such disclosed modes illustrating, however, but several of various ways in which the principle of my invention may be used.

By way of explanation, I shall describe my invention as applying to the preparation of 4-chloro-aniline. For example, 1.4-chloro-bromobenzene, aqueous ammonia and a copper-containing catalyst, e. g. cuprous oxide, cuprous chloride or other cuprous compound, in the preferred amounts, are charged into a suitable reactor, e. g. an autoclave, and then heated to a temperature sufficient to react the more labile halogen with the base and leave the remaining halogen substantially unattacked, for instance, in the region of 80 to 150° C., and preferably with continuous agitation. When the reaction is substantially completed, the autoclave is cooled, the contents removed therefrom and filtered to obtain the solid product, namely crude 4-chloro-aniline, which may then be purified in any suitable manner, such as by distillation. An additional amount of product may be obtained from the ammoniacal filtrate by extraction of the latter with benzene, or equivalent solvent, followed by fractional distillation of the extract, or in any other desired way.

Further, the desired product may be isolated in the form of its hydrochloride or equivalent salt. For instance, the reaction mixture or the filtrate after separation of the soil product, e. g. principally 4-chloro-aniline, may be extracted with a volatile organic solvent such as benzene, (in which the amine is more soluble than the hydrochloride thereof), to dissolve the product together with unreacted raw material, the extract then being dried and the amine hydrochloride precipitated therefrom by passing substantially anhydrous hydrochloric acid gas thereinto or over the surface thereof. The solid hydrochloride may be separated from the residual solution, for example, by filtration, and then treated, if desired, to recover free amine therefrom, for instance by adding caustic alkali thereto, followed by distillation of the freed amine. Unreacted raw material, e. g. 1.4-chloro-bromobenzene, may be recovered in any suitable way from the organic solvent and returned to the process.

The conditions of the present method are such as to avoid, so far as possible, the formation of substantial amounts of secondary products such as are represented, for example, by the following equations:—

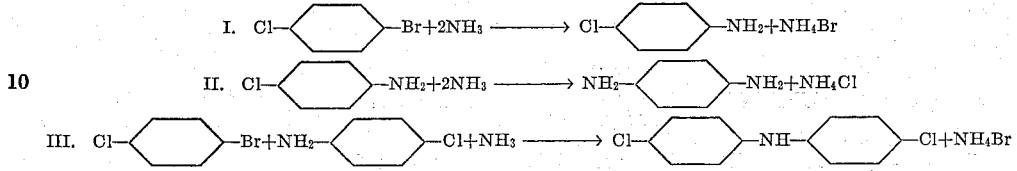

Equation I represents the desired reaction, the more reactive halogen, i. e. bromine, alone being substantially reacted with the base at the temperature used. Equation II represents an undesired secondary reaction which may occur at higher temperatures. Equation III also represents the formation of an undesired by-product, such compound having a more pronounced tendency to form when the reaction step is carried out in a medium wherein an insufficient amount of ammonia is used.

The following examples illustrate my new method, but it is understood that such examples impose no limitation upon my invention.

*Example 1*

A mixture of 134 grams 4-chloro-bromobenzene, 245 cubic centimeters aqueous ammonia (specific gravity 0.90) and 14.4 grams cuprous oxide was heated in a rotating steel autoclave to approximately 120° C. for about 10 hours. After cooling, the solid crude product was separated from the reaction mixture by filtration and distilled, thereby obtaining 74.5 grams of 4-chloro-aniline. An additional 5 grams product was obtained by extracting the ammoniacal filtrate with benzene, followed by fractional distillation of the extract. The combined yield was 89 per cent of the theoretical amount of pure 4-chloro-aniline having a melting point of 69° C.

*Example 2*

In a manner similar to Example 1, 67 grams of 3.4-dichloro-bromo-benzene was reacted with 123 cc. of aqueous ammonia (27 per cent) in the presence of 7.2 grams cuprous oxide, by heating in a bomb for 70 hours at 90–95° C. The cooled reaction mixture was extracted with benzene, the so-obtained extract then being dried and saturated with dry hydrogen chloride gas, thereby obtaining 3.4-dichloro-aniline hydrochloride in an 80 per cent yield. The hydrochloride was dissolved in water, rendered alkaline to litmus by the addition of caustic soda solution and the free base formed thereby distilled, yielding substantially pure 3.4-dichloro-aniline in an almost theoretical yield (based on the hydrochloride).

*Example 3*

Similarly as above, 19.2 grams 4-chloro-bromobenzene was reacted with 45 grams of aqueous mono-methyl amine (33%) in the presence of 2 grams cuprous chloride for 4½ hours at 110° C. The yield of 4-chloro-(N-methyl)-aniline (B. P. 236°–239° C.) was 83 per cent.

I do not limit myself to the use of the specifically aforementioned reaction components. Other dissimilarly polyhalogenated aromatic compounds, e. g. 1.4-chloro-bromonaphthalene, may be reacted in like fashion with one of the aforementioned ammonia bases, varying the conditions of the operative steps, if and when necessary, dependent upon the particular components employed. The reaction may be carried out in aqueous or equivalent media, e. g. alcohol.

Accordingly, by utilizing the variance in reactivity of different halogens substituted in the ring of an aromatic hydrocarbon, it is possible to prepare halogenated aromatic amines, such as the chloro-anilines. In brief, my new method involves reacting between a volatile ammonia base of the abovementioned nature and a polyhalogenated aromatic hydrocarbon wherein there are at least two different halogens attached to an aromatic nucleus in the 1:4-positions to each other, and under conditions such that the more reactive halogen is selectively replaced by the entering basic group, as illustrated for example by the reaction,

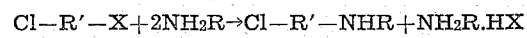

$$Cl-R'-X+2NH_2R \rightarrow Cl-R'-NHR+NH_2R \cdot HX$$

wherein R' represents an aromatic group such as benzene or naphthalene, X represents a halogen of greater atomic weight than chlorine, and R represents hydrogen or an alkyl group, such as methyl, ethyl, etc.

As catalyst for the purpose of accelerating the above reaction, I prefer to use a cuprous compound as aforementioned. However, other copper-containing catalyst capable of effecting the ammonolysis of the herein described compounds, may optionally be employed, e. g. cupric chloride, or equivalent thereof. Further, the cuprous compound utilized, may be added to the reactants before reaction occurs, or may be formed in the reaction mixture, i. e. by reduction of a cupric compound.

Other modes of applying the principle of my invention may be employed instead of the one explained, change being made as regards the details herein disclosed, provided the step or steps stated by any of the following claims or the equivalent of such be employed.

I therefore particularly point out and distinctly claim as my invention:—

1. The method of making a 4-chloro-aniline, which comprises heating 4-chloro-bromo-benzene with an aqueous ammonia base of the formula, NH₂R, wherein R represents hydrogen or an alkyl group, in the presence of a copper-containing catalyst capable of promoting the ammonolysis of a nuclear halogenated aromatic compound, under super-atmospheric pressure, and at temperature between 80° and 150° C.

2. The method of making a 4-chloro-aniline, which comprises heating 4-chloro-bromo-benzene with an aqueous ammonia base of the formula, NH₂R, wherein R represents hydrogen or an alkyl group, in the presence of a cuprous compound capable of promoting the ammonolysis of a nuclear halogenated aromatic compound, under super-atmospheric pressure, and at temperature between 80° and 150° C.

3. The method of making 4-chloro-aniline, which comprises heating 4-chloro-bromo-benzene with aqueous ammonia in the presence of a copper-containing catalyst capable of promoting the ammonolysis of a nuclear halogenated aromatic compound, under super-atmospheric pressure, and at a temperature of about 120° C.

4. The method of making 4-chloro-aniline, which comprises heating 4-chloro-bromo-benzene with aqueous ammonia in the presence of a cuprous compound capable of promoting the ammonolysis of a nuclear halogenated aromatic compound, under super-atmospheric pressure, and at a temperature of about 120° C.

5. The method of making a 4-chloro-aniline, which comprises reacting 4-chloro-bromo-benzene with an ammonia base of the formula, $NH_2R$, wherein R represents hydrogen or an alkyl group, in the presence of a cuprous compound capable of promoting the ammonolysis of a nuclear halogenated aromatic compound and at a temperature between 80° and 150° C., then extracting the cooled reaction mixture with a practically inert immiscible solvent in which the aromatic primary or secondary amine is more soluble than the hydrochloride thereof, reacting the dried extract with substantially anhydrous hydrochloric acid gas to precipitate the aromatic amine hydrochloride, and recovering the 4-chloro-aniline from the latter after separation thereof from the residual liquid.

6. The method of making a chloro-aromatic amine, which comprises heating a chloro-bromo-hydrocarbon, of the group consisting of the benzene and naphthalene series of hydrocarbons, wherein a chlorine and a bromine substituent are in the 1:4 position to each other, with an aqueous ammonia base of the formula, $NH_2R$, wherein R represents hydrogen or an alkyl group, in the presence of a copper-containing catalyst capable of promoting the ammonolysis of a nuclear halogenated aromatic compound, at a temperature between 80° and 150° C. and under super-atmospheric pressure, whereby substantially only the bromine is reacted.

7. The method of making a chloro-aromatic amine, which comprises heating a chloro-bromo-hydrocarbon, of the group consisting of the benzene and naphthalene series of hydrocarbons, wherein a chlorine and a bromine substituent are in the 1:4 position to each other, with an aqueous ammonia base of the formula, $NH_2R$, wherein R represents hydrogen or an alkyl group, in the presence of a cuprous compound capable of promoting the ammonolysis of a nuclear halogenated aromatic compound at a temperature between 80° and 150° C., and under super-atmospheric pressure, whereby substantially only the bromine is reacted.

8. The method of making a chloro-aromatic amine, which comprises heating a chloro-bromo-hydrocarbon, of the group consisting of the benzene and naphthalene series of hydrocarbons, wherein a chlorine and a bromine substituent are in the 1:4 position to each other, with an ammonia base of the formula, $NH_2R$, wherein R represents hydrogen or an alkyl group, in the presence of a copper-containing catalyst capable of promoting the ammonolysis of a nuclear halogenated aromatic compound, under super-atmospheric pressure and at a temperature between 80° and 150° C. whereby only the bromine is substantially reacted, then extracting the cooled reaction mixture with a practically inert immiscible solvent in which the primary or secondary amine is more soluble than the hydrochloride thereof, reacting the dried extract with substantially anhydrous hydrochloric acid gas to precipitate the aromatic amine hydrochloride, and recovering the free aromatic amine from the latter after separation thereof from the residual liquid.

9. The method of making 3.4-dichloro-aniline which comprises heating 3.4-dichloro-bromo-benzene with aqueous ammonia in the presence of a copper-containing catalyst capable of promoting the ammonolysis of a nuclear halogenated aromatic compound, under super-atmospheric pressure to a temperature between about 80° and about 150° C.

LINDLEY E. MILLS.